(12) United States Patent
Cahill

(10) Patent No.: US 9,073,530 B2
(45) Date of Patent: Jul. 7, 2015

(54) SYSTEMS AND METHODS FOR REFLECTED INERTIA PARKING BRAKE

(75) Inventor: Eric D. Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 293 days.

(21) Appl. No.: 13/472,333

(22) Filed: May 15, 2012

(65) Prior Publication Data

US 2013/0311005 A1 Nov. 21, 2013

(51) Int. Cl.
*G01C 23/00* (2006.01)
*B60T 13/74* (2006.01)
*B64C 25/40* (2006.01)
*B64C 25/44* (2006.01)

(52) U.S. Cl.
CPC .............. *B60T 13/741* (2013.01); *B64C 25/405* (2013.01); *B64C 25/44* (2013.01); *Y02T 50/823* (2013.01)

(58) Field of Classification Search
CPC ......... B60T 8/1703; B60T 8/00; B60T 8/885; G05D 1/0083; G01C 21/00; G01C 23/005; G08G 5/0021
USPC ........... 701/3, 9, 67; 303/2, 20, 138; 475/154, 475/312; 244/103, 50; 188/71.5, 72.1
See application file for complete search history.

(56) References Cited

U.S. PATENT DOCUMENTS

| | | | | |
|---|---|---|---|---|
| 2,430,163 | A * | 11/1947 | Dever | 310/67 R |
| 3,711,043 | A * | 1/1973 | Cameron-Johnson | 244/50 |
| 3,977,631 | A * | 8/1976 | Jenny | 244/50 |
| 4,865,162 | A * | 9/1989 | Morris et al. | 188/72.8 |
| 6,006,149 | A * | 12/1999 | Salecker et al. | 701/51 |
| 7,469,858 | B2 * | 12/2008 | Edelson | 244/103 S |
| 2003/0042357 | A1 * | 3/2003 | Van Cor | 244/60 |
| 2005/0200328 | A1 * | 9/2005 | Edson et al. | 318/611 |
| 2006/0175897 | A1 * | 8/2006 | Ether | 303/138 |
| 2006/0206246 | A1 * | 9/2006 | Walker | 701/16 |
| 2008/0133073 | A1 * | 6/2008 | Griffith et al. | 701/9 |
| 2008/0135349 | A1 * | 6/2008 | Himes et al. | 188/71.5 |
| 2008/0150353 | A1 * | 6/2008 | Griffith et al. | 303/126 |
| 2011/0198439 | A1 * | 8/2011 | Rotger et al. | 244/50 |
| 2013/0062466 | A1 * | 3/2013 | Sweet et al. | 244/103 R |

FOREIGN PATENT DOCUMENTS

| | | |
|---|---|---|
| EP | 1686029 | 8/2006 |
| EP | 2664507 | 11/2013 |
| WO | 2011-110363 | 9/2011 |

OTHER PUBLICATIONS

Extended Search Report, dated Oct. 10, 2013 in European Application No. 13159280.0.

* cited by examiner

*Primary Examiner* — Helal A Algahaim
*Assistant Examiner* — Shardul Patel
(74) *Attorney, Agent, or Firm* — Snell & Wilmer, L.L.P.

(57) ABSTRACT

Systems and methods are disclosed for parking brake systems for use in, for example, an aircraft. In this regard, a system is provided comprising a parking brake system for an aircraft comprising an electric motor coupled to a high gear ratio transmission, a first clutch for engaging the electric motor to a propulsion transmission, and a second clutch for engaging propulsion transmission to an aircraft wheel. The high gear ratio transmission has a gear ratio sufficient to maintain the aircraft wheel in a stationary position.

17 Claims, 4 Drawing Sheets

SYSTEMS AND METHODS FOR REFLECTED INERTIA PARKING BRAKE

FIELD

The present disclosure is related to systems and methods for a reflected inertia parking brake for use in, for example, an aircraft.

BACKGROUND

Aircraft often include a parking brake system that enables brake actuation in the event the aircraft is parked. In aircraft with hydraulic brakes, brake pressure may decline over time as the parking brake is engaged. Accumulators may be used to combat the decline, but parking brake force still typically degrades over time. In aircraft with electric brakes, power may be needed to maintain the brake force, which may be considerable depending upon the static friction coefficient of the brake stack. Thus, there is a need for improved parking brake systems.

SUMMARY

Systems and methods disclosed herein may be useful for use in parking brake systems. In this regard, a system is provided comprising an electric motor coupled to a high gear ratio transmission, a first clutch for engaging the electric motor to a propulsion transmission, and a second clutch for engaging a propulsion transmission to an aircraft wheel. The high gear ratio transmission has a gear ratio sufficient to maintain the aircraft wheel in a stationary position.

In various embodiments, a method and/or a computer readable storage medium having instructions is provided comprising stopping an electric motor (the electric motor is coupled to a high gear ratio transmission), engaging a first clutch to couple the high gear ratio transmission and a propulsion transmission, and engaging a second clutch to couple the propulsion transmission and an aircraft wheel. The high gear ratio transmission has a gear ratio sufficient to maintain the aircraft wheel in a stationary position.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

Figure 1:
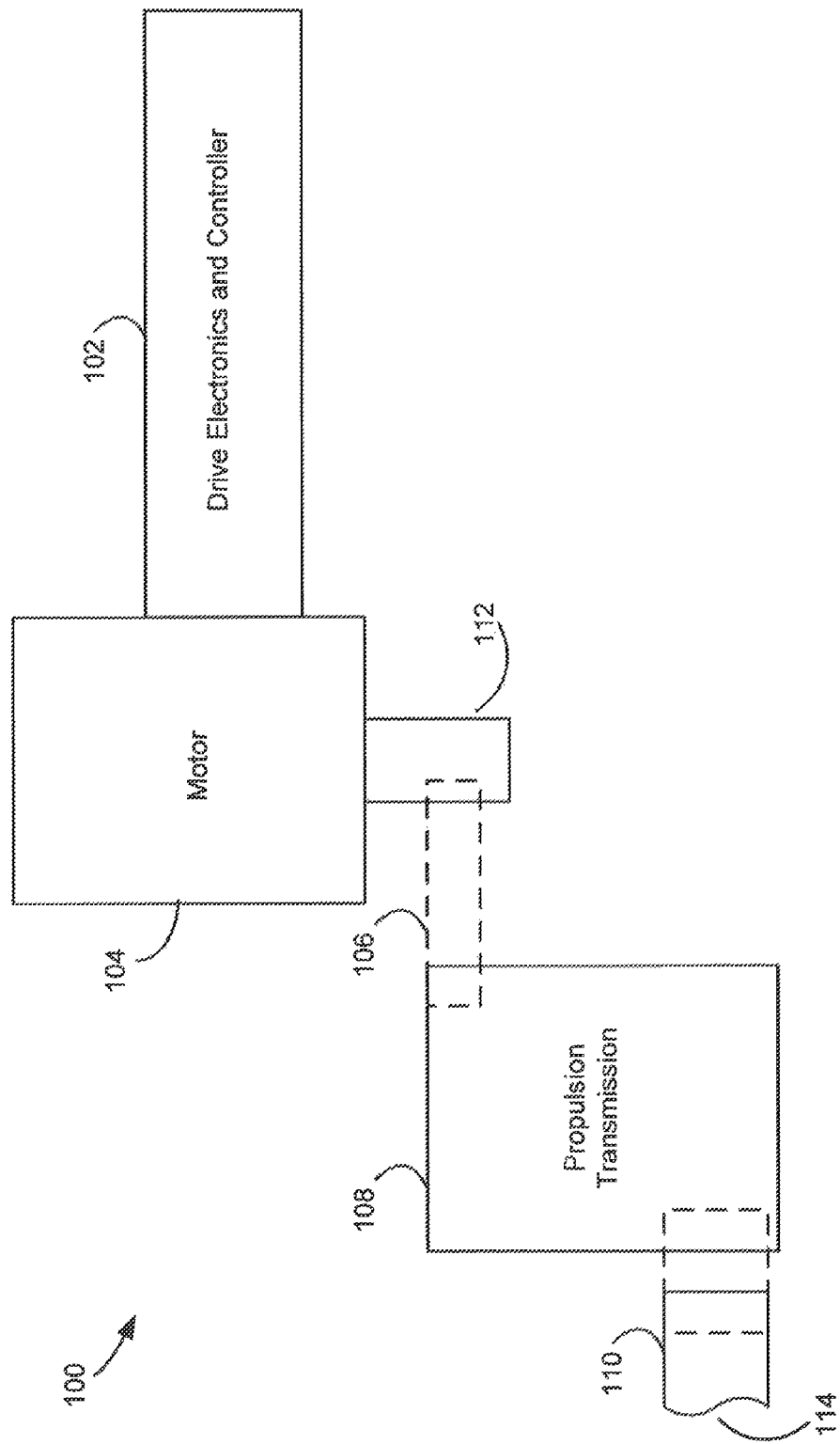
FIG. 1 illustrates a parking brake system in accordance with various embodiments.

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for parking brake systems for use in aircraft. Aircraft may comprise one or more types of aircraft wheel and brake assemblies. For example, an aircraft wheel and brake assembly may comprise a non-rotatable wheel support, a wheel mounted to the wheel support for rotation, and a brake disk stack. The brake stack may have front and rear axial ends and alternating rotor and stator disks mounted with respect to the wheel support and wheel for relative axial movement. Each rotor disk may be coupled to the wheel for rotation therewith and each stator disk is coupled to the wheel support against rotation. A back plate may be located at the rear end of the disk pack and a brake head may be located at the front end. The brake head may house one or more actuator rams that extend to compress the brake disk stack against the back plate, or the brake disk stack may be compressed by other means. Torque is taken out by the stator disks through a static torque tube or the like.

The actuator rams may be electrically operated actuator rams or hydraulically operated actuator rams, although some brakes may use pneumatically operated actuator rams. In brake systems that employ fluid powered (hydraulic or pneumatic power) actuator rams, the actuator ram may be coupled to a power source via a brake servo valve ("BSV") and a shutoff valve ("SOV"). The SOV effectively functions as a shutoff valve, wherein in a first position (e.g., an armed position), fluid pressure is permitted to pass through the valve, while in a second position (e.g., a disarmed position) fluid pressure is restricted or prevented from passing through the valve. During normal braking, the SOV is in the armed position, thereby permitting the flow of fluid pressure. The BSV, based on braking commands from the pilot (often via an electronic controller that may implement, for example, anti-skid logic) controls the amount of fluid pressure provided to the actuator ram, and thus, the braking force applied to the wheel. To prevent or minimize unintentional braking (e.g., due to a faulty servo valve) at various times, the SOV is set in the disarmed position, thereby removing or decreasing fluid pressure from the BSV. Since the BSV does not receive sufficient fluid pressure, it cannot provide fluid pressure to the actuator ram, and thus, braking cannot be effected.

In electronic brakes, a brake controller is coupled to one or more electromechanical actuator controllers ("EMAC") for a brake, which drives one or more electromechanical brake actuators. The brake controller may be in communication with a brake pedal, and thus may control the EMAC in accordance with pilot/copilot braking commands. In various aircraft, other means are used to compress a brake disk stack.

Various aircraft may employ an electric taxi system. An electric taxi system may provide taxiing capability to the aircraft. In conventional aircraft, jet engines or propellers are used to provide the force needed to taxi (i.e., move the aircraft while on the ground). Jet engines are not as fuel efficient in such low speed applications, resulting in relatively high fuel consumption and excess noise. For example, an aircraft may taxi to and from a gate to a runway. An electric taxi system may comprise one or more electric motors that, through various gear trains (i.e., transmissions), drive the wheels of an aircraft. In this manner, taxiing may be accomplished in a more energy efficient manner with reduced noise. In various embodiments, hydraulic taxiing may be used.

In that regard, an electric taxi system may be designed to use a relatively low torque output electric motor coupled to one or more transmissions having high gear ratios, which produce a relatively higher torque output than the input torque. Thus, an electric taxi system may be designed with smaller, lighter weight motors that are capable of driving an aircraft, and particularly, larger jet aircraft.

In addition to providing acceptable torque to taxi an aircraft, high gear ratio transmissions may introduce a large amount of reflected inertia at an aircraft wheel. The large amount of reflected inertia may then be harnessed to provide a resistance to aircraft wheel roll during parking. In various embodiments, the reflected inertia is sufficient to maintain the aircraft wheel in a stationary position. Stated another way, the reflected inertia of an electric taxi system may be used as a parking brake for the aircraft. In this regard, no hydraulic pressure is lost over time, as the amount of reflected inertia is static over time. Thus, the parking brake's effectiveness will likely not degrade over time. Moreover, in various embodiments, no additional power is required to maintain the brake in an actuated state.

With reference to FIG. 1, electric taxi system 100 is shown in accordance with various embodiments. Drive electronics controller 102 is shown in electrical communication with motor 104. Drive electronics controller 102 may comprise hardware and/or software that implement logic to control motor 104. Drive electronics controller 102 may comprise a computer readable, non-transitory storage medium. Drive electronics controller 102 may also comprise electronic drivers that provide drive signals to motor 104. Motor 104 comprises an electric motor. Motor 104 may comprise any suitable electric motor such as a brushless DC motor. Brushed DC motors and brushless AC motors are also contemplated herein.

Motor 104 may be coupled to high gear ratio transmission 112. High gear ratio transmission 112 may comprise a gear train that has a high gear ratio. A high gear ratio as used herein may be from about 30:1 to about 110:1, more preferably from about 40:1 to about 80:1, and more preferably about 50:1. As described below, a high gear ratio transmission may have a variable final gear ratio, so the high gear ratio transmission may vary from one ratio to another depending upon configuration. Any high gear ratio transmission that has at least one final gear ratio from about 30:1 to about 110:1 may be considered a high gear ratio transmission, even though the high gear ratio transmission may be adjusted to variably have a gear ratio outside such range.

High gear ratio transmissions, as described below, are difficult to back drive due to high reflected inertia. Stated another way, reflected inertia at the aircraft wheel is high enough to prevent movement and is sufficient to maintain the aircraft wheel in a stationary position. It should be noted that the gear ratio equals output torque, $\tau_o$, divided by the input torque, $\tau_i$, as illustrated by:

$$R = \frac{\tau_o}{\tau_i}$$

Or, stated another way:

$$R\tau_i = \tau_o$$

In such a manner, a gear ratio of 50:1 may receive a $\tau_i$ of 3 Nm and produce $\tau_o$ of 150 Nm. The use of a high gear ratio transmission thus enables the use of lower torque producing motors to produce higher torque outputs.

In addition, high gear ratio transmissions increase reflected inertia seen at a motor. Reflected load inertia may be expressed as below, where $J_r$ is the reflected load inertia, $J_1$ is the inertia of the load (i.e., the transmission) and N is the gear ratio:

$$J_r = \frac{J_1}{N^2}$$

Of course, the gear ratio is inversed when viewed from the perspective of the motor. For example, a 50:1 gear ratio becomes a 1/50 gear ratio when viewed from the perspective of the motor. As $N^2$ is in the denominator, small changes in gear ratio may have a significant effect on reflected load inertia. It should further be noted that the total inertia seen at a motor is equal to the reflected inertia plus the inertia of the motor itself, which is shown below, where $J_m$ is the inertia of the motor.

$$J_r = \frac{J_1}{N^2} + J_m$$

The inertia of a transmission ($J_1$) may be calculated using any suitable means known in the art. As an example, for a solid cylinder, inertia is shown below, where J is inertia, W is mass, R is radius, and g is the gravity of the Earth (recognized to be about 9.8 m/s²):

$$J = \frac{WR^2}{2g}$$

With reference back to FIG. 1, high gear ratio transmission 112 thus creates a high level of reflected load inertia seen at motor 104. High gear ratio transmission 112 is coupled to propulsion transmission 108 via clutch 106. Clutch 106 may comprise any suitable clutch. Clutch 106 selectively engages and disengages high gear ratio transmission 112 from propulsion transmission 108. In various embodiments, high gear ratio transmission 112 and propulsion transmission 108 mate via meshing gears, though other suitable mechanical matings are contemplated herein. Clutch 106 may be mechanically actuated (ie, selectively engaged and disengaged) or may be actuated using hydraulics or electronics such as a transmission solenoid. Clutch 106 may be mechanically actuated in response to one or more gear teeth sensors that detect the position of gear teeth and thus are able to determine when two or more gears align. For example, clutch 106 may be a selectively movable gear. In various embodiments, a friction clutch or magnetic clutch may also be used, and the need to sense or detect individual gear teeth may thus be lessened or eliminated.

Propulsion transmission 108 comprises any suitable gear train for aircraft propulsion. In various embodiments, propulsion transmission 108 has a lower gear ratio than high gear ratio transmission 112, though in certain embodiments propulsion transmission 108 may have a higher gear ratio than high gear ratio transmission 112. Propulsion transmission 108 may have a gear ratio of from about 40:1 to 200:1, or preferably 50:1 to 200:1, though other gear ratios are contemplated in accordance with the particular motor selected.

Propulsion transmission 108 is coupled to aircraft wheel 114 via clutch 110. Clutch 110 may comprise any suitable clutch. Clutch 110 selectively engages and disengages propulsion transmission 108 from aircraft wheel 114. Clutch 110 may be mechanically actuated (ie, selectively engaged and disengaged) or may be actuated using hydraulics or electronics such as a transmission solenoid. Clutch 110 may be mechanically actuated in response to one or more gear teeth sensors that detect the position of gear teeth and thus are able to determine when two or more gears align. In various embodiments, propulsion transmission 108 and aircraft wheel 114 mate via meshing gears, though other suitable mechanical matings are contemplated herein. In various embodiments, aircraft wheel 114 includes one or more gear teeth along an interior circumference adjacent to or close to the aircraft wheel tire. To increase torque, it is desirable for the mating of the propulsion transmission 108 and aircraft wheel 114 to occur at a point as far from the rotational axis of the aircraft wheel as possible.

To effect parking, clutch 106 and clutch 110 may both be actuated to the engaged position. In this state, the aircraft wheel is in mechanical connection to the motor through both the high gear ratio transmission 112 and the propulsion transmission 108. The gear ratios of high gear ratio transmission 112 and the propulsion transmission 108 and the inertia of motor 104 may be selected to achieve a given total reflected inertia that would be sufficient to maintain an aircraft in a stationary position. The total reflected inertia may be selected so that the stationary position would be maintained within a given range of runway grade, though runways tend to have a grade of almost 0 (i.e., almost flat). The total reflected inertia may be selected so that the stationary position would be maintained within a given range of wind speed or other applied force.

For example, the force required to move an aircraft may be represented by the below, equation, where N is the normal force (weight of aircraft) and μ is the rolling resistance of the aircraft:

$$F = \mu \cdot N$$

For an 80,000 kg aircraft with a rolling resistance of 0.01, F=800 kg. This force may be dived by the number of wheels of the aircraft that contain a parking brake system. For example, an aircraft may have four wheels, each with a parking brake system. Thus, each tire must exert 200 kg of force for the aircraft to move in response to the parking brake being disengaged. For an aircraft wheel with a 0.5 m radius, the torque required to produce 200 kg is about 983 Nm. The gear ratios of high gear ratio transmission 112 and the propulsion transmission 108 and the inertia of motor 104 may be selected to resist such force, and more force that may be exerted by outside forces. As described above, small changes in gear ratios correspond to larger increases in reflected inertia.

Figure 2:
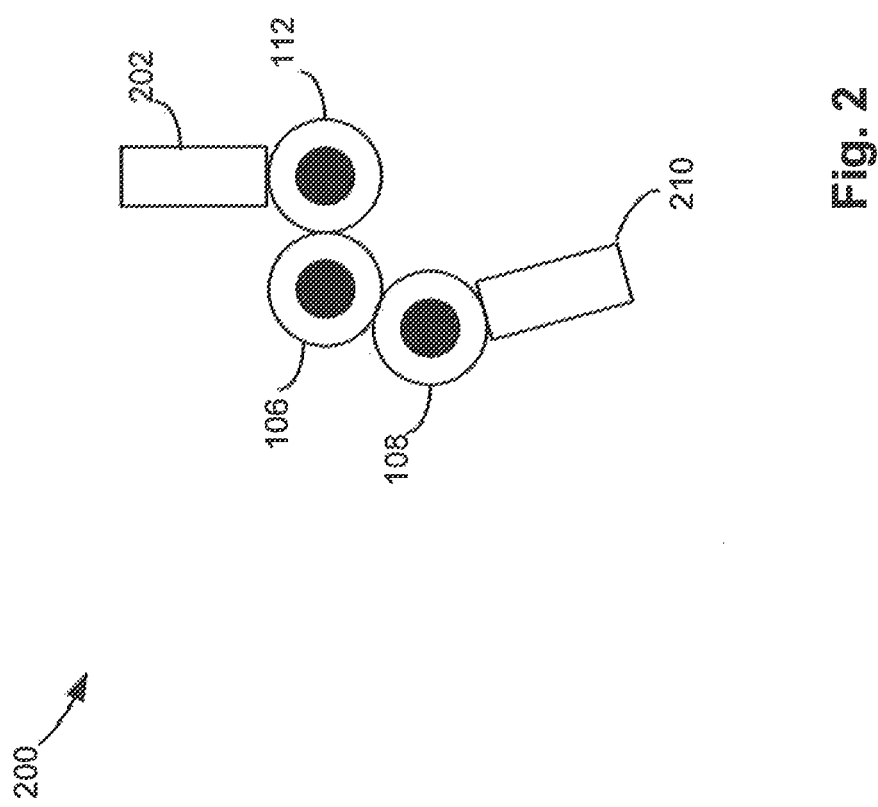
FIG. 2 illustrates an expanded view of a portion of the parking brake system of FIG. 1, in accordance with various embodiments.
Figure 3:
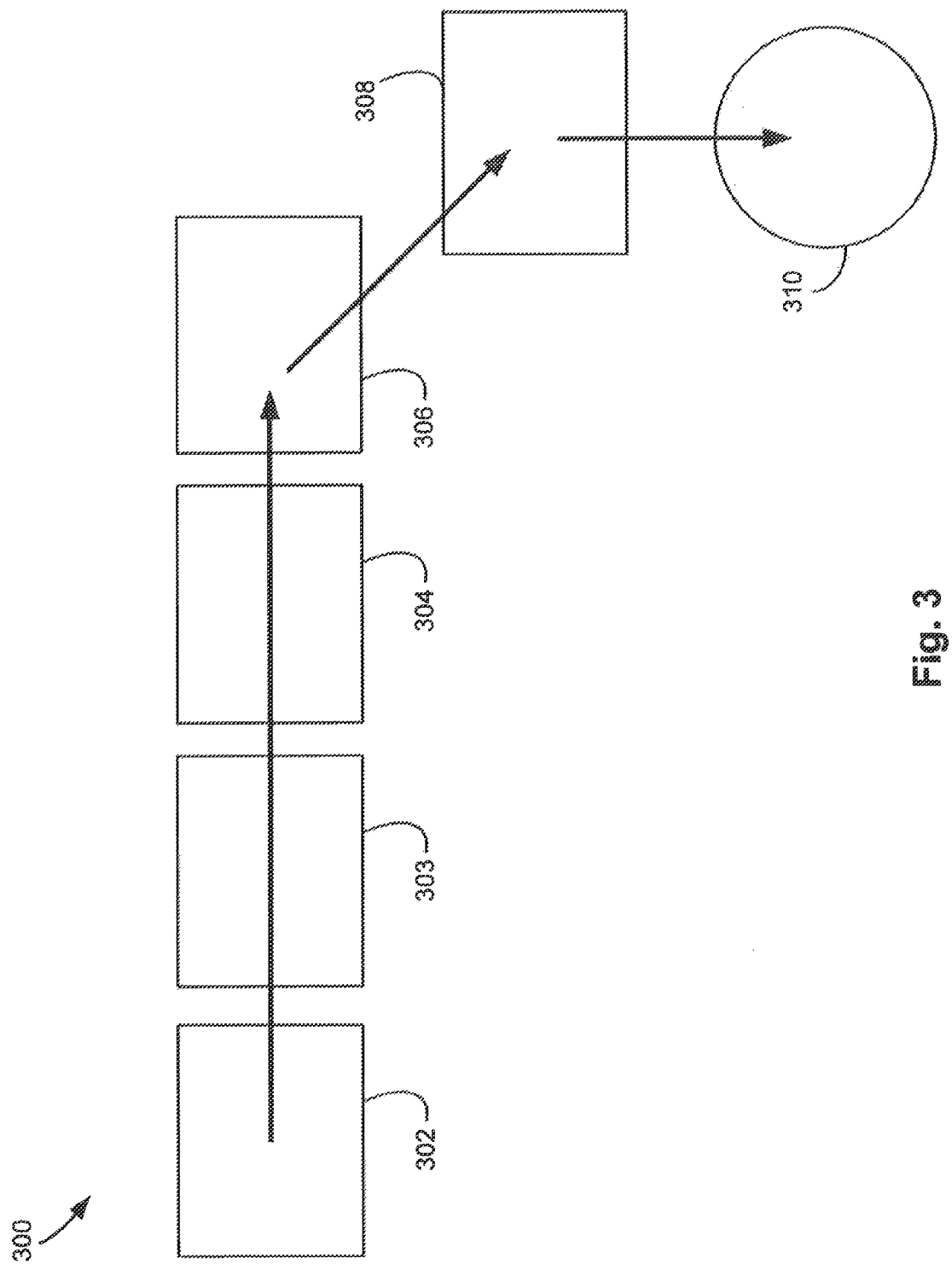
FIG. 3 illustrates a schematic of a parking brake system in accordance with various embodiments.

With reference to FIG. 2, clutch assembly 200 is shown. Clutch assembly 200 is an expanded view of the coupling between high gear ratio transmission 112 and propulsion transmission 108. High gear ratio transmission 112 receives torque input from motor 104. Clutch 106 is shown engaged with high gear ratio transmission 112 and propulsion transmission 108. Gear tooth sensor 202 senses the position of gear teeth of high gear ratio transmission 112. Clutch 106 is selectively actuated, so clutch 106 may be disengaged to remove high gear ratio transmission 112 from contact with propulsion transmission 108. When clutch 106 is disengaged from high gear ratio transmission 112, the clutch may be referred to as in a neutral position. Gear tooth sensor 210 senses the position of gear teeth of propulsion transmission 108.

With reference to FIG. 2, a functional diagram of parking brake system 300 is shown. Processor 302 comprises a processor and a non-transitory storage computer readable medium that implements logic to control the parking brake system. Processor 302 commands motor drive 303. Motor drive 303 receives commands from processor 302 and produces drive signals for motor 304 in response to and in accordance with the command signals. Motor 304 receives the drive signals from motor drive 303 and causes motor 404 to turn in response to the drive signals. As discussed above, motor 304 is a brushless DC motor though the use of any electric motor is contemplated herein. Motor 304 provides a mechanical torque input into high gear ratio transmission 306. High gear ratio transmission 306 comprises a high gear ratio transmission, for example one in the range of 40:1 to 80:1. A first clutch couples high gear ratio transmission 306 with propulsion transmission 308. The first clutch operates to selectively engage high gear ratio transmission 306 with propulsion transmission 308. Such engagement may be in response to commands from processor 302 or other aircraft components. A second clutch couples propulsion transmission 308 with aircraft wheel 310. The second clutch operates to selectively engage propulsion transmission 308 with aircraft wheel 310. Such engagement may be in response to commands from processor 302 or other aircraft components. In various embodiments, however, a second clutch is not used and a propulsion transmission may be fixedly engaged with an aircraft wheel.

Figure 4:
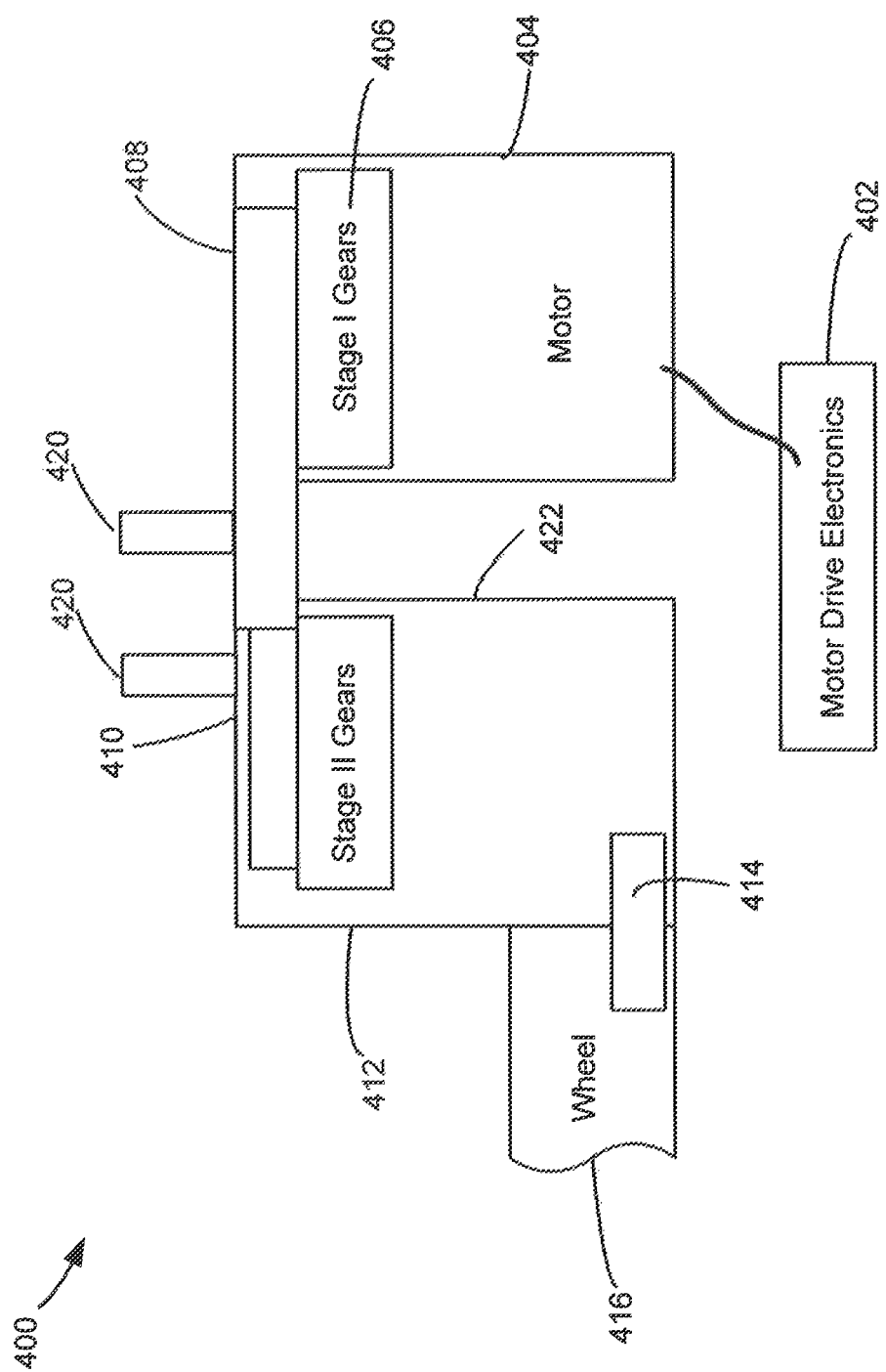
FIG. 4 illustrates a parking brake system in accordance with various embodiments.

With reference to FIG. 4, parking brake system 400 is shown. Motor drive electronics 402 comprises a processor and a non-transitory storage computer readable medium that implements logic to control the parking brake system. Motor drive electronics 402 also comprises a motor driver that receives commands from a processor and produces drive signals for motor 404 in response to and in accordance with the command signals. Motor 404 receives the drive signals from motor drive electronics 402 and causes motor 404 to turn in response to the drive signals. As discussed above, motor 404 is a brushless DC motor though the use of any electric motor is contemplated herein.

Motor 404 provides a mechanical torque input into stage I gears 406. Stage I gears 406 is a component of a high gear ratio transmission that comprises stage I gears 406 and drive gear 408. Stage I gears 406 comprises a gear train having a high gear ratio. Stage I gears 406 transfers torque from motor 404 to drive gear 408. The gear ratio as measured from the input of stage I gears 406 to the output of drive gear 408 a high gear ratio transmission, for example one in the range of 40:1 to 80:1. Gear tooth sensors 420 may sense the rotational position of gear teeth. In that regard, the output of gear tooth sensors 420 may be used to determine when gear teeth align, which may then be used to actuate a clutch. As should be appreciated, the use of gear tooth sensors may be used within the context of any clutch disclosed herein.

A first clutch 410 couples drive gear 408 with stage II gears 412. Gear train 422 and stage II gears 412 comprise a propulsion transmission. The first clutch 410 operates to selectively engage drive gear 408 with stage II gears 412. Such engagement may be in response to commands from motor drive electronics 402 or other aircraft components.

Stage II gears 412 may couple with gear train 422. Second clutch 414 couples stage II gears 412 with aircraft wheel 416. Second clutch 414 operates to selectively engage gear train 422 with aircraft wheel 416. Such engagement may be in response to commands from motor drive electronics 402 or other aircraft components.

Aircraft wheel 416 may comprise one or more teeth configured to engage with stage II gears 412. The teeth of aircraft wheel 416 may be located along an inner portion of the rim of aircraft wheel 416, for example, on or in a flange on aircraft wheel 416. In this regard, it is beneficial for the teeth of aircraft wheel 416 to be located at as near a large radius as possible to maximize torque applied to the wheel, as $\tau = F \times r$.

Transmissions disclosed herein may internally comprise one or more clutches. Moreover, transmissions disclosed herein may comprise the ability to variably adjust the final gear ratio. Such adjustment may be accomplished using any suitable configuration. For example, internal clutches may be used to select different gears internally to affect final gear ratio. Further, continuously variable mechanisms may be used to change final gear ratio. Variable adjustment of final gear ratio may be controlled electronically and/or mechanically and/or hydraulically. The aforementioned features may be included in any transmission disclosed herein to tune final gear ratio, input/output torque and input/output rotational velocity. While the transmissions disclosed herein may be primarily comprised of gears, the transmissions contemplated herein may include one or more other modes of torque transmission such as belts, chains, levers, pulleys, and the like.

A cockpit control system may be configured to selectively engage the various clutched contemplated herein. In this manner, a pilot or copilot, for example, may engage/disengage the clutches to control the parking brake functionality. Moreover, a wheel control panel may contain a control system configured to selectively engage the various clutched contemplated herein. In this manner, ground crew may engage/disengage the clutches to control the parking brake functionality. This may be useful in situations where the ground crew may tow the aircraft.

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A parking brake system for an aircraft comprising:
   an electric motor coupled to a high gear ratio transmission;
   a first clutch for engaging the electric motor to a propulsion transmission; and
   a second clutch for engaging propulsion transmission to an aircraft wheel,
   wherein the high gear ratio transmission has a gear ratio sufficient to maintain the aircraft wheel in a stationary position,
   wherein the high gear ratio transmission has a gear ratio of between about 40:1 to about 200:1.

2. The system of claim 1, wherein the propulsion transmission engages the aircraft wheel along a circumference of the aircraft wheel.

3. The system of claim 1, wherein the high gear ratio transmission comprises a drive gear.

4. The system of claim 1, wherein at least one of the first clutch and the second clutch is actuated by a transmission solenoid.

5. The system of claim 1, wherein at least one of the first clutch and the second clutch is controlled by at least one of a cockpit control system and a wheel control panel.

6. The system of claim 1, wherein a parking brake mode is entered in response to the first clutch having an engaged position and the second clutch having an engaged position.

7. The system of claim 6, wherein the electric motor may effect motion of the aircraft wheel while in the parking brake mode.

8. A method comprising:
   stopping an electric motor, the electric motor coupled to a high gear ratio transmission;
   engaging a first clutch to couple the high gear ratio transmission and a propulsion transmission; and
   engaging a second clutch to couple the propulsion transmission and an aircraft wheel,
   wherein the high gear ratio transmission has a gear ratio sufficient to maintain the aircraft wheel in a stationary position, wherein the high gear ratio transmission has a gear ratio of between about 40:1 to about 80:1.

9. The method of claim 8, wherein the engagement of the second clutch and the aircraft wheel occurs along a circumference of the aircraft wheel.

10. The method of claim 8, further comprising receiving, at an electric motor control unit, a command to engage the first clutch.

11. The method of claim 8, further comprising driving the electric motor to cause rotation of the aircraft wheel.

12. The method of claim 8, wherein the engaging the first clutch to couple the high gear ratio transmission and the propulsion transmission is performed by a transmission solenoid.

13. The method of claim 8, wherein the high gear ratio transmission comprises a drive gear.

14. A non-transitory computer readable storage medium bearing instructions for manual braking, the instructions, when executed by a processor, cause said processor to perform operations comprising:
   stopping an electric motor, the electric motor coupled to a high gear ratio transmission;
   engaging a first clutch to couple the high gear ratio transmission and a propulsion transmission; and
   engaging a second clutch to couple the propulsion transmission and an aircraft wheel,
   wherein the high gear ratio transmission has a gear ratio sufficient to maintain the aircraft wheel in a stationary position, wherein the high gear ratio transmission has a gear ratio of between about 40:1 to about 80:1.

15. The non-transitory computer readable medium of claim 14, wherein the engagement of the second clutch and the aircraft wheel occurs along a circumference of the aircraft wheel.

16. The non-transitory computer readable medium of claim 14, wherein the operations further comprise driving the electric motor to cause rotation of the aircraft wheel.

17. The non-transitory computer readable medium of claim 14, wherein the engaging the first clutch to couple the high gear ratio transmission and the propulsion transmission is performed by a transmission solenoid.

* * * * *